3,170,951
PROCESS FOR THE PREPARATION OF SULFO-N-ALKYLPROPIONAMIDES
Edward Helmut Sheers, Flushing, N.Y., and David Randal Sexsmith, Stamford, Conn., assignors to American Cyanamid Company, Stamford, Conn., a corporation of Maine
No Drawing. Filed May 23, 1963, Ser. No. 282,598
7 Claims. (Cl. 260—513)

The present invention relates to an improved process for the preparation of sulfo-N-alkylpropionamides and to an integrated process for the preparation of such materials.

By "integrated process" is meant a process which is accomplished without the isolation or separation of intermediate products or by-products from the beginning of the process to the formation of the final product.

Sulfo-N-alkylpropionamides or the sulfonated derivatives of N-alkylacrylamides may be prepared by sulfonating so-called Ritter reaction products. Thus, Ritter reaction products formed by reacting a suitable olefin or mixtures of suitable olefins and a suitable α-unsaturated nitrile in the presence of a cationoid material such as strong sulfuric acid may be prepared, isolated and sulfonated. In such a procedure the so-called Ritter reaction product, the N-alkylacrylamide, is first isolated to the extent that this is possible from impurities, as for example, the sulfates resulting from the interaction between the olefins and sulfuric acid. It is extremely difficult to isolate the N-alkylacrylamide from these materials due to the fact that they tend to form a stable emulsion. This difficulty in separation of the N-alkylacrylamides is made more difficult when mixed olefins are employed due to the fact that the resulting N-alkylacrylamides in general have a lower melting point and are more readily emulsified. In general, procedures which require separation or isolation of the intermediate prior to sulfonation result in significantly lower yield, rarely higher than 70% weight yield.

In addition, after isolation of the N-alkylacrylamides from by-product materials such as alkane sulfates, the acrylamides normally would be sulfonated slightly on the acid side or at an approximately neutral pH. Sulfonations carried out at the slightly acid or neutral pH's are slow and require as much as 20 hours before a suitable yield of a sulfonated N-alkylacrylamide can be prepared and in addition reaction products so formed contain substantial amounts of undesirable polymer.

Accordingly, it is an object of the present invention to provide a process in which a Ritter reaction product is sulfonated rapidly while maintaining a pH above a critical level whereby a sulfonated N-alkylacrylamide containing a minimum amount of undesirable polymer is obtained.

It is a further object of the present invention to provide an integrated process in which the presence of alkane sulfates in the Ritter reaction product is employed to advantage, improving the efficiency of the sulfonation step of said process.

It is a further object of this invention to provide an integrated process for preparing sulfonated N-alkylacrylamides in which said sulfonated N-alkylacrylamides may be prepared consistently in high yields, i.e., on the order of 90% or more by weight.

These and other objects and advantages of the present invention will become more apparent from the detailed description thereof set forth hereinbelow.

In accordance with the present invention, a process is provided which comprises reacting N-alkylacrylamide with an alkali bisulfite, while maintaining a pH of at least 7.5 to thereby readily produce a sulfonated N-alkylacrylamide relatively free of polymer. The N-alkylacrylamide is preferably a reaction product resulting from the reaction of an olefin or mixtures of olefins having at least 10 carbon atoms and an α-unsaturated nitrile in the presence of a cationoid material such as strong sulfuric acid.

The olefins employed in the preparation of the N-alkylacrylamides in accordance with this invention are olefins characterized by having at least 10 carbons and up to 40 carbon atoms, and preferably from between 10 and about 20 carbon atoms. Preferably they are predominantly straight chain. When the sulfonated N-alkylacrylamide end product is to be employed as a detergent, it is preferred that the olefin be a long chain material having at least 10 carbon atoms. Such olefins and mixtures thereof are available from the petroleum industry. As examples of suitable olefins, the following are illustrative: decene-1, decene-2, decene-3, decene-4, decene-5, undecene-1, undecene-2, undecene-3, undecene-4, undecene-5, dodecene-1, dodecene-2, dodecene-3, dodecene-4, dodecene-5, dodecene-6, tridecene-1, tridecene-2, tridecene-3, tridecene-4, tridecene-5, tridecene-6, tetradecene-1, tetradecene-2, tetradecene-3, tetradecene-4, tetradecene-5, tetradecene-6, tetradecene-7, pentadecene-1, pentadecene-2, pentadecene-3, pentadecene-4, pentadecene-5, pentadecene-6, pentadecene-7, hexadecene-1, hexadecene-2, haxedecene-3, hexadecene-4, hexadecene-5, hexadecene-6, hexadecene-7, hexadecene-8, octadecene-1, octadecene-2, octadecene-3, octadecene-4, octadecene-5, octadecene-6, octadecene-7, octadecene-8, octadecene-9, telomers of isopropylene and isobutylene such as propylene tetramer, propylene hexamer, triisobutylene, tetraisobutylene, and mixtures of two or more of such olefins or their equivalents.

The α-unsaturated nitrile should be a material which when condensed with the olefin is capable of bisulfite addition at its unsaturated double bond. Principally such nitriles include acrylonitrile, α-substituted acrylonitrile, such as methacrylonitrile, α-chloroacrylonitrile and β-substituted acrylonitriles such as crotononitrile, β-chloroacrylonitrile and other equivalent materials.

The reaction between the long chain olefin and the nitrile is carried out in the presence of a cationoid substance capable of fully protonizing the double bond of the olefin. Thus, any material capable of this function in the reaction whereby the intermediate secondary or tertiary N-alkylacrylamides are prepared is contemplated. However, as a practical matter, such a cationoid substance is limited to strong sulfuric acid, by which term is meant sulfuric acid having a concentration of 90% and greater and usually a concentration of from between 95 and 100%.

The reaction between the long chain olefin and an α-unsaturated nitrile in the presence of strong sulfuric acid, which reaction product is sulfonated in accordance with this invention, may be carried out in accordance with the procedure of U.S.P. No. 2,573,673. In such a procedure relative mole ratios of approximately 1:1:1 olefin to nitrile to acid are reacted at suitable temperatures to form reaction products containing secondary N-alkylacrylamides.

As will be apparent, the term N-alkylacrylamide as it is employed herein is intended to include the Ritter reaction product, which results from the reaction of suitable α-unsaturated nitriles and suitable olefins, as those terms are described herein, in the presence of a cationoid substance such as sulfuric acid.

Preferably, the olefin or mixtures thereof and a suitable unsaturated nitrile are reacted in the presence of strong sulfuric acid, equimolar amounts of each being employed. If desired, excess nitrile may be employed, though in general no particular advantage is obtained thereby. Preferably, the strong sulfuric acid is added to a mixture of the nitrile and the olefin while said mixture is being maintained at a temperature of less than 90° C. and preferably from between 20° and 80° C. After the addition of the acid, the reaction mixture is maintained at a temperature of 40° to less than 90° C. whereby the N-alkylacrylamide reaction products are prepared.

As noted hereinabove, the alkane sulfates need not be removed in accordance with the process aspects of this invention, particularly when the end sulfonated derivatives are to be employed as detergent surface active agents, a function for which they are admirably suited.

When the reaction forming the intermediate N-alkylacrylamide is complete, which may be readily determined by empirical means, the pH of the reaction mixture in accordance with the present invention is adjusted from a value of less than 2 and usually about 1, immediately to a value above 7.5 and very preferably above 8.0. The pH, insofar as we are aware, may be any value above 8, as for example up through pH 14, though we find no advantage in exceeding pH 12, and in fact it is economically undesirable to alkalize to pH values higher than 10. After alkalizing to a pH above 8, an excess of an alkali bisulfite, as for example sodium, potassium, lithium or ammonium metabisulfite, is added as is a solvent. After the bisulfite addition, further pH adjustment may be required to insure a pH above 7.5 and preferably above 8. The solvent, in the case of C-20 or less olefins, may be a suitable alcohol, as for example methanol, ethanol or n-propyl alcohol, isopropyl alcohol or solvents of similar polarity. Such solvents provide a single phase (either a solution or an emulsion) in the case of C-20 or less olefins, while suitable hydrocarbon solvents such as Stoddard solvents and Varsol perform similarly when the olefin or mixtures are C-20 plus. This reaction mixture is then normally heated at a temperature of from 50° C. to 150° C. and preferably at a temperature of from 60° C. to 90° C. Optimumly the reaction is carried out under reflux. The time of reaction in general varies inversely with the temperature and the time required at a specific temperature may within broad limits be readily determined. Illustratively, sulfonation under reflux may be carried out over periods of from 1 to 5 hours. The alcohol is subsequently stripped off and a clear solution of sulfonated N-alkylacrylamide results.

The presence of minor amounts (less than 50% by weight of the N-alkylacrylamide reaction product) as for example at least 0.5% and preferably not more than 20% of the alkane sulfates, as noted hereinabove, actually improves the efficiency of the sulfonation step of this invention in that it functions as an emulsifying agent for the N-alkylacrylamide reaction product, insuring finer particle size and therefore greater contact with the sulfonating agent, namely the water-soluble alkali bisulfite. The bisulfite is normally added in an amount to insure complete sulfonation. Usually an equivalent of the bisulfite is sufficient, though slight excesses, as for example excesses up to 15%, may be employed. Greater excesses are deemed to be unnecessary and undesirable economically due to the difficulty in destroying the excess bisulfite, and due to the fact that this destruction is relatively costly.

As will be demonstrated more clearly hereinafter, employing a pH above 7.5 for sulfonation is absolutely essential if the sulfonation reaction is to be completed in a reasonable time, for example on the order of from 1-5 hours, and if the sulfonated N-alkylacrylamides are to be comparatively free of polymer material. As will be seen more clearly hereinafter, the difference between the employment of a pH of 7 and a pH of 8 during the sulfonation of N-alkylacrylamides is the difference between amounts on the order of 6 to 7% of polymer as compared with less than 1% polymer in the final product and reaction times of from approximately 7 to approximately 1 hour's time.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

2.5 moles of $C_{11}$–$C_{15}$ olefin fraction having an average carbon chain length of 13 and an average molecular weight of 180, and 2.5 moles of acrylonitrile are reacted in the presence of 2.5 moles of concentrated sulfuric acid (95.5%). After the addition of acid, the temperature of the reaction mixture is maintained at about 50° C. until a reaction product containing principally an N-alkyl ($C_{11}$–$C_{15}$) acrylamide and minor amounts (about 5%) of alkane ($C_{11}$–$C_{15}$) sulfate is formed. In a series of five experiments, equal portions of this reaction product are added with stirring to 400 ml. of water in a flask equipped with pH electrodes connected to a pH meter and recorder. Aqueous potassium hydroxide is added slowly thereto until a pH of 9–12 is obtained. Phosphoric acid is then added to the alkaline reaction product mixture to adjust the pH to various pH values from between 6 and 10, as indicated in Table I hereinbelow. Then 0.25 gram of hydroquinone is added. Thereafter, 52.25 grams (.55 mole, 10% excess) of sodium metabisulfite and 250 ml. of isopropyl alcohol are added to the N-($C_{11}$–$C_{15}$) alkyl acrylamide reaction product and the pH is again adjusted to the values between 6 and 10 set forth in Table I below. The reaction vessel is heated to reflux (84° C.) while maintaining the pH at the value indicated and until a 1-ml. sample gives a clear solution in 100 ml. of water. This test determines if the sulfonation end point has been reached. The isopropyl alcohol is then stripped off and the by-product polymer collected and weighed. The following results are obtained for the series of experiments at pH values from 6 to 10.

*Table 1*

| Run No. | pH | Reaction Time, Hours | Polymer, Percent [1] |
| --- | --- | --- | --- |
| 1 | 6.0 | 8 | 2.8 |
| 2 | 7.0 | 3 | 6.8 |
| 3 | 8.0 | 2.5 | 0.6 |
| 4 | 9.0 | 2.5 | 0.6 |
| 5 | 10.0 | 2.5 | 0.6 |

[1] Weight of polymer/Weight of active ingredient × 100.

Table I hereinabove demonstrates dramatically that both the reaction time and the amount of polymer in the finished sulfonated N-alkylacrylamides are markedly reduced when the pH during sulfonation is above 8.

EXAMPLE 2

To a stirred mixture of 241 parts (1 mole) of a mixed ($C_{15}$–$C_{20}$) α-unsaturated olefin fraction having an average molecular weight of 241 and 58.4 parts (1.1 mole) of acrylonitrile there is added slowly and with stirring 98.0 parts of sulfuric acid (98%) while maintaining the temperature at from between 40 and 60° C. This addition requires about 30 minutes. The mixture is then stirred for 1 hour more and 800 parts of water, 100 parts of isopropyl alcohol are added and the resulting emulsion is adjusted to a pH of 8 with sodium hydroxide and phosphoric acid. 95 parts (0.5 mole) of sodium metabisulfite is then added and the pH again adjusted to 8. The emulsion is refluxed (84° C.) for 2.5 hours and the isopropyl alcohol removed by distillation. The resulting solution is pale yellow in color. On cooling, the product separates as a white solid.

EXAMPLE 3

Essentially the same procedure as was employed in Example 2 is employed here except that 215 parts (1 mole) of octadecene-1, 58.4 parts (1.1 mole) of acrylonitrile, 98.0 parts (1.1 mole) of concentrated (98%) sulfuric acid and 104.6 parts (0.55 mole) of sodium metabisulfite are employed. The appearance of the product is the same as in Example 2.

EXAMPLE 4

Essentially the same procedure as was employed in Example 2 is employed herein except that 181 parts of mixed $C_{20+}$ α-unsaturated olefins having an average molecular weight of 362 and constituting 0.5 mole of olefin dissolved in Varsol is employed with 29.2 parts (0.55 mole) acrylonitrile. 49 parts (0.5 mole) of concentrated (98%) sulfuric acid and 52.3 parts (0.275 mole) of sodium metabisulfite are employed. The upper layer containing Varsol is then separated. The lower layer containing by-product inorganic salts is discarded.

EXAMPLE 5

Essentially the same procedure as in Example 2 is employed herein except that 168 parts of dodecene-1 (1 mole) is employed.

In Examples 2–5 above, the intermediate N-alkylacrylamide reaction product contained minor amounts of alkane sulfate, less than about 20% by weight of said reaction product.

EXAMPLE 6

Essentially the same procedure as was employed in Example 2 is employed here except that 112 parts (0.5 mole) tetraisobutylene is employed. The product is a pale yellow liquid having surface-active properties.

The reactions described hereinabove will normally be carried out at atmospheric pressure, although subatmospheric or superatmospheric pressure may be employed.

As will be seen, the present process is readily adapted to being rendered continuous or semicontinuous and readily results in sulfonated N-alkyl-acrylamides, which compounds have important utility in detergents and as surface active agents. In this regard, the sulfonated long chain N-alkylacrylamides of this invention have been demonstrated to have excellent wetting, dispersing, lathering and cleansing capabilities, and may be employed singly or in combination with one another to accomplish these functions.

This application is a continuation-in-part application of our copending application Serial No. 111,462, filed May 22, 1961, now abandoned.

While this invention has been described in conjunction with various preferred embodiments, it is to be understood that the invention is not to be solely limited thereto but is to be construed broadly and restricted only by the appended claims.

We claim:

1. A process which comprises reacting an N-alkylacrylamide in which the alkyl group contains at least 10 carbon atoms with an alkali bisulfite while maintaining a pH of at least 7.5 to prepare sulfonated N-alkylacrylamide relatively free of polymer.

2. A process which comprises reacting a reaction product mixture resulting from the reaction of an olefin having at least 10 carbon atoms and an α-unsaturated nitrile in the presence of strong sulfuric acid and characterized by the principal reaction product being an N-alkylacrylamide, with an alkali bisulfite while maintaining a pH of at least 7.5 to prepare sulfonated N-alkylacrylamide relatively free of polymer.

3. A process according to claim 2 in which the pH of the reaction mixture is from 8 to about 12, inclusive.

4. A process according to claim 2 in which the olefin contains from 10 to 20 carbon atoms and the α-unsaturated nitrile is acrylonitrile.

5. A process which comprises reacting an olefin having at least 10 carbon atoms and an α-unsaturated nitrile in the presence of strong sulfuric acid to form a reaction product containing an N-alkylacrylamide, adjusting the pH of said reaction product to at least 8 and reacting the said N-alkylacrylamide with an alkali bisulfite to prepare sulfonated N-alkylacrylamide relatively free of polymer.

6. A process which comprises reacting an olefin having between 10 and 20 carbon atoms and acrylonitrile in the presence of sulfuric acid until a reaction product that is principally an N-alkylacrylamide is formed, adjusting the pH of said reaction product to between 8 and 12 and adding thereto an alkali bisulfite, maintaining said pH at between 8 and 12 to prepare sulfonated N-alkylacrylamide relatively free of polymer.

7. A process which comprises reacting an olefin having between 10 and 20 carbon atoms and acrylonitrile in the presence of sulfuric acid until a reaction product that is principally an N-alkylacrylamide but which also contains as by-product an alkyl sulfate, is formed, adjusting the pH of said reaction mixture to between 8 and 12 and reacting an alkali bisulfite therewith, while maintaining said pH at from 8–12 to prepare sulfonated N-alkylacrylamide that is relatively free of polymer.

References Cited in the file of this patent

UNITED STATES PATENTS

| | | |
|---|---|---|
| 2,573,673 | Ritter | Oct. 30, 1951 |
| 2,576,501 | Dalton | Nov. 27, 1951 |

OTHER REFERENCES

Kharasch: J. Org. Chem., vol. 3, 1938, p. 176.
Mayo: Chem. Reviews, vol. 27, 1940, pp. 396–397.